(12) United States Patent
Chraplyvy et al.

(10) Patent No.: US 6,191,877 B1
(45) Date of Patent: Feb. 20, 2001

(54) WDM OPTICAL FIBER SYSTEM USING RAMAN AMPLIFICATION

(75) Inventors: Andrew R. Chraplyvy, Matawan; Fabrizio Forghieri, Princeton; Robert William Tkach, Little Silver, all of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 08/683,044

(22) Filed: Jul. 15, 1996

Related U.S. Application Data

(63) Continuation-in-part of application No. 08/390,736, filed on Feb. 17, 1995, now abandoned.

(51) Int. Cl.$^7$ ................. H04J 14/02; H01S 3/00
(52) U.S. Cl. ............ 359/124; 359/160; 359/179; 359/334; 359/345
(58) Field of Search ................. 359/124, 173, 359/179, 333, 334, 341, 345, 160, 174, 188; 372/3, 6, 69; 385/123

(56) References Cited

U.S. PATENT DOCUMENTS

| | | | |
|---|---|---|---|
| 5,035,481 | * 7/1991 | Mollenauer | 359/124 |
| 5,039,199 | * 8/1991 | Mollenauer et al. | 359/334 |
| 5,327,516 | 7/1994 | Chraplyvy et al. | 385/123 |
| 5,392,377 | * 2/1995 | Auracher | 359/179 |

OTHER PUBLICATIONS

Peng, "Step–by–Step BSRS Amplification in Long–Span Optical Fiber Communication," *Electronic Letters*, vol. 26, No. 5, 1990, pp. 334–336.*

Zhang et al, "Backward Raman Amplification Used to Alleviate SRS Limitations in High–Density WDM Systems", IEE Colloq., No. 159, 1990, pp. 5/1–5/3.*

Stewart E. Miller and Ivan P. Kaminow, *Optical Fiber Telecommunications II*, Academic Press, Inc. 1988, p. 97.

W. Jiang and P. Ye, *J. Lightwave Tech.*, vol. 7, No. 9, pp. 1407–1411, Sep. 1989.

L.F. Mollenauer, J.P. Gordon and M.N. Islam, *IEEE J. Quant. Elec.*, vol. QE–22, No. 1, pp. 157–173, Jan. 1986.

L.F. Mollenauer and K. Smith, *Optics Lett.*, vol. 13, No. 8, pp. 675–677, Aug. 1988.

S. Bahsoun, D.A. Fishman and J.A. Nagel, *SPIE*, vol. 1789, pp. 260–266, 1992.

H. Po, J.D Cao, B.M. Laliberte, R.A. Minns, et al. *Elec. Lett.*, vol. 29, No. 17, p. 1500, Aug. 1993.

Li, "The impact of Optical Amplifiers on Long–Distance Lightwave Telecommunications", *Proceedings of IEEE*, vol. 81, No. 11, Nov. 1993, pp. 1568–1579.*

Kao, "Signal light amplification by Stimulated Raman scattering in an N–channel WDM Optical Fiber Communication System", *Journal of Lightwave Technology*, vol. 7, No. 9, Sep. 1989, pp. 1290–1299.*

* cited by examiner

*Primary Examiner*—Bhavesh Mehta
(74) *Attorney, Agent, or Firm*—George S. Indig

(57) ABSTRACT

Pump depletion modulation crosstalk between WDM channels in Raman amplified systems is virtually eliminated by exclusive use of backward pumping.

10 Claims, 1 Drawing Sheet

WDM OPTICAL FIBER SYSTEM USING RAMAN AMPLIFICATION

This application is a continuation-in-part of application Ser. No. 08/390,736, filed on Feb. 17, 1995, now abandoned.

TECHNICAL FIELD

Wavelength Division Multiplexed (WDM) optical fiber communications.

DESCRIPTION OF RELATED ART

The erbium-doped silica-based fiber amplifier (EDFA) has had a large impact on fiber communications. Its operating wavelength range is in the 1550 nm low-loss wavelength region of silica-based fiber. Its substantial bandwidth permits simultaneous amplification of an entire set of WDM channels, and makes WDM operation feasible.

State-of-the-art optical fiber systems operate at 2.5 Gb/s or 5 Gb/s, at a nominal system wavelength of 1550 nm, using EDFAs spaced up to 120 km apart. Planned four-channel WDM systems quadruple that capacity, and more channels are contemplated. Attention is being given to next generation communication systems of still greater capacity. Consideration has been given to incorporation of a second set of WDM channels at a system wavelength of 1310 nm. Praseodymium, while of appropriate emission wavelength, does not offer a 1310 nm optical amplifier analogous to the 1550 nm EDFA, due to a radiationless transition in the silica fiber. Alternative approaches have considered fluoride-based fiber, and single crystal amplifiers.

Needs of soliton systems, which require operation within a critical intensity range to maintain pulse shape, at any system wavelength (at 1550 nm as well as 1310 nm), are not easily satisfied with the EDFA. It has been recognized for some time that Raman amplification, in principle, offers a solution. Postulated soliton systems have used the entire fiber as the Raman amplification medium, with pump-injection points at 20–60 km spacing to maintain signal intensity sufficiently constant. See, Stewart E. Miller and Ivan P. Kaminow, *Optical Fiber Telecommunications II*, Academic Press, Inc. 1988, at p. 97.

A reliable, truly distributed, fiber amplifier would avoid the alternating increasing and decreasing intensities of lumped amplifiers and lessen non-linear effects in conventional systems as well.

The Raman mechanism is operative in the backward pumping, as well as the forward pumping, direction. See, article by W. Jiang and P. Ye, *J. Lightwave Tech.*, vol. 7, no. 9, pp. 1407–1411, September 1989, in which the authors acknowledge the possibility. Accordingly, elements required for substitution for the EDFA seemed to be in place.

While true of single-channel systems, pump depletion modulation (PDM), however, imposes constraints on Raman amplified WDM systems. Crosstalk among WDM channels is caused by a two-step process in which: a) extraction of energy from the initially cw pump wave by a first modulated channel effectively modulates the pump by depletion; and b) the now-modulated pump in turn modulates a second channel being amplified. This pump-mediated crosstalk is of constant amplitude as modulation frequency increases, but beyond some threshold, decreases to a tolerable level (in accordance with a relationship dependent on the reciprocal of frequency). Using proposed systems, pump depletion modulation inhibits WDM operation on signals with significant modulation components below tens of megahertz. This effectively precludes contemplated WDM operation.

Jiang and Ye, J. Lightwave Tech. cited above, postulate that crosstalk in backward Raman amplification is smaller, but dismiss the approach based on other performance characteristics.

By analogy to usual EDFA designs, proposed Raman systems use bidirectional pumping for best results—to maintain constancy of intensity; to minimize number of amplifiers; to avoid excessive signal levels with their non-linear effects. *IEEE J. Quant. Elec.* vol. QE-22, no. 1, pp. 157–173, January 1986; and *Optics Lett.* vol. 13, no. 8, pp. 675–677, August 1988 both describe WDM systems using bidirectionally-pumped distributed Raman amplification.

SUMMARY OF THE INVENTION

Under real system conditions, PDM crosstalk is found to be sharply reduced—by more than three orders of magnitude using backward pumping. The extent of improvement means that there is no meaningful performance penalty due to PDM. Raman amplified optical fiber WDM systems using backward pumping, and operating at per-channel bit rates of gbits, and higher, become practical. Systems are preferably distributed and use the entire transmission fiber for amplification, but may use lumped amplifiers. All systems using intensity-modulation are included—digital systems, prevalent for long distance use; and analog systems, e.g. for cable TV and "fiber to the home".

Preferred systems completely forgo forward pumping. Using reverse pumping alone, the low frequency limit imposed by PDM, is reduced by a factor of $10^3$, to tens of kilohertz.

Terminology

Raman Amplification—Amplification by which energy is transferred from an electromagnetic pump wave to a lower frequency signal wave via a molecular vibration. The responsible mechanism is stimulated Raman scattering (SRS).

Regenerator—Apparatus in which an optical signal to be amplified, is converted to an electrical signal, amplified, and converted back to an optical signal.

Pump Depletion Modulation (PDM)—Channel-to-channel crosstalk due to depletion of the pump during amplification of a first channel and subsequent transfer of that first channel information to a second channel being amplified.

Lumped Amplifier—An identifiable length of fiber, with substantial responsibility for amplification in series with transmission line. As applied to Raman amplification, the terminology requires pump injection directly to the amplifying fiber.

Distributed Amplifier—In the context of Raman amplification, an amplifier constituted of all or a substantial length of the transmission fiber itself. As usually contemplated, the distributed amplification fiber is unmodified transmission fiber.

Span or Fiber Span—Without further modifier, refers to the length of transmission fiber serviced by a single Raman amplifier. For distributed amplification, the terminology refers to the length of transmission fiber between successive pump injection points.

Regenerator Span—Length of optical fiber between successive regenerators.

Model System—System including at least one regenerator span of 360 km in length and provided with three pump injection points. This is a formalization, intended only to expedite discussion, and is not intended as a prediction of the form Raman amplified systems will take.

DETAILED DESCRIPTION

Figure 1:
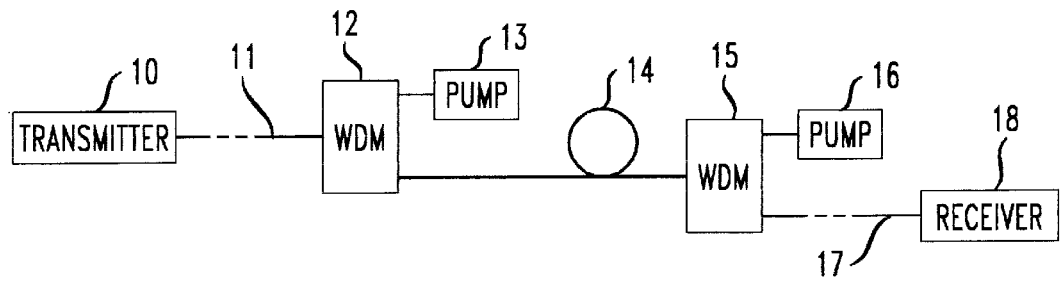
FIG. 1 is a schematic view showing an amplified portion of a span of a WDM system.

FIG. 1 is a simplified schematic and is used as representative of systems using the invention. It omits a number of required and optional elements: isolator, multiplexer, demultiplexer, etc., and includes only those elements required for description of the invention.

FIG. 1 shows a transmitter 10, fiber spans 11, 14 and 17, WDMs 12 and 15, pumps 13 and 16, and receiver 18. The preferred embodiment of the invention uses the entire fiber span 14 extended between pumps 13 and 16 as the amplifying medium.

A. The operating system is multi-channel—generally four or more channels—with the entire set closely-spaced to permit simultaneous amplification. A typical EDFA, with its usable amplification bandwidth of 12 nm or greater, permits a 4-channel set with channel-to-channel spacing of 3 nm. Systems now in the planning stage operate at 1 nm spacing or less, and, together with improved EDFAs with broadened bandwidth, will permit far larger channel sets. Raman amplification in the glass medium, offers comparable or better bandwidth. A known attribute of the Raman amplifier permits tailoring of the spectral band by use of multiple pumps. The spectral width may be expanded; amplification factor may be made uniform across carriers; amplification factor may be varied from channel to channel. T. Li, "The Impact of Optical Amplifiers on Long Distance Lightwave Telecommunications" *Proc. of IEEE*, pp. 1568–1579, (1993), describes a variety of WDM systems to which the invention is applicable.

It is possible to describe usual power levels required for Raman amplification in systems contemplated by the invention. Assuming a conservative loss value of 10 dB for an amplified span of 40 km, the power requirement to offset the loss is 800 watt-km-nm/40 km or 20 watt-nm (which, for a pump-to-signal separation of 100 nm, requires a pump level of 0.2 watt).

B. Forms of transmitter 10 are described in "Fiber Laser Sources and Amplifiers IV", *SPIE*, vol. 1789, pp. 260–266 (1992). The transmitter introduces the four or more WDM channels and includes means for generating and modulating the channel carriers and for multiplexing. Each channel generally has its dedicated laser and modulator.

C. The nature of the transmission line 11, 14,16 has undergone considerable revision. Fiber has evolved from multimode; to single-mode with 1550 nm dispersion characteristics similar to those of the bulk glass; to dispersion-shifted fiber (DSF) with its dispersion null point at the system wavelength of 1550 nm; and to the fiber of U.S. Pat. No. 5,327,516, dated Jul. 5, 1994. That patented design is one solution to the finding of a need for a small but critical variation in group velocities between WDM channels to avoid degradation due to 4-wave mixing (4WM). Alternative system approaches described in pending U.S. patent application Ser. No. 08/069,952, filed May 28, 1993, include concatenation (with successive fiber sections of alternating signs of dispersion), and use of major lengths of "standard" fiber or other non-zero dispersion fiber in series with compensating fiber of sufficiently-high dispersion of opposite sign. All such systems, even including 4WM-prone DSF, are suitable from the invention standpoint alone. Choice will depend on other considerations.

D. An attractive feature of Raman amplification is permitted use of the transmission fiber as the amplifying medium. Such a distributed amplifier, in which fiber loss is continually compensated, suits needs of soliton transmission. It is useful in minimizing non-linear effects such as self-phase modulation for soliton and non-soliton alike. Initial commercialization is expected to take that form. Accordingly, the entirety of span 14 may serve as a distributed Raman amplifier.

In the "model" system, span 14, bounded by pumps 13 and 16, is 120 km in length and is embraced by similar spans such as those of fibers 11 and 17. The model is intentionally analogous to EDFA systems-in planning. While useful for discussion, spacing of pump injection points may be closer to most effectively compensate for loss in present day fiber. Unfortunately, foregoing forward pumping shortens the pump injection interval required for intensity constancy. Postulated soliton systems, based on 50–60 km spacings, will now require spacings of the order of half that. The closer spacing is likely not required for PDM crosstalk reduction.

E. Pumps 13 and 16, while shown schematically as blocks, may be constituted of two or more coupled elements. A likely pump design is the cladding pump laser described by H. Po, et al. in *Elec. Lett.* vol. 29, no. 17, p. 1500 (1993). U.S. patent application Ser. No. 08/178,142, filed Jan. 6, 1994, describes use of fiber interference gratings for wavelength stabilization. The inventive systems may use this arrangement, although, SRS interaction in the glass medium of the fiber is not critically dependent on pump wavelength and may not require stabilization.

Recent work, pursuing pump designs based on cladding pump principles, has resulted in high-power pump structures with pump-to-signal frequency separation for effective Raman transfer. See U.S. Pat. No. 5,323,404, issued Jun. 21, 1994. An exemplary system entails Raman-downshifting in a CW Nd:YAG laser to reduce separation sufficiently to permit transfer by first Stokes interaction. The FIG. 2 description, in prescribing a separation of ~120 nm, falls within that range. In more general terms, separation of 15 terahertz or smaller is prescribed. This is equivalent to a wavelength spacing of about 120 nm at a signal frequency of 1550 nm: at 1310 nm, the equivalent wavelength spacing is about 100 nm. Practical implementation of Raman-amplified fiber systems depends on this work.

For the most part, the concept of remote pumping as contemplated for EDFAs, does not play a role. Fiber used in a lumped Raman amplifier would be optimized for amplification, e.g., by smaller core size, high Ge concentration (larger than conventionally used in state-of-the-art transmission fiber), or even by use of a different composition ($GeO_2$-based rather than $SiO_2$-based). Even where lumped amplifiers of specialized fiber are used, remote pumping through the transmission fiber, ordinarily results in some additional amplification. This may be acceptable—even desired—but it is inaccurate to describe the pumping as remote. Truly remote pumping will require pump transmission in a separate medium, as in the fiber cladding or in a separate fiber. Local pumping, and distributed amplification beginning at the point of injection and continuing along the fiber (in the direction counter to signal transmission) is the more likely arrangement.

Receiver 18, may include a demultiplexer for selectively routing a chosen channel. (Time division, multiplexing/demultiplexing of channels, is unaffected by the inventive teaching and is not discussed.)

Figure 2:
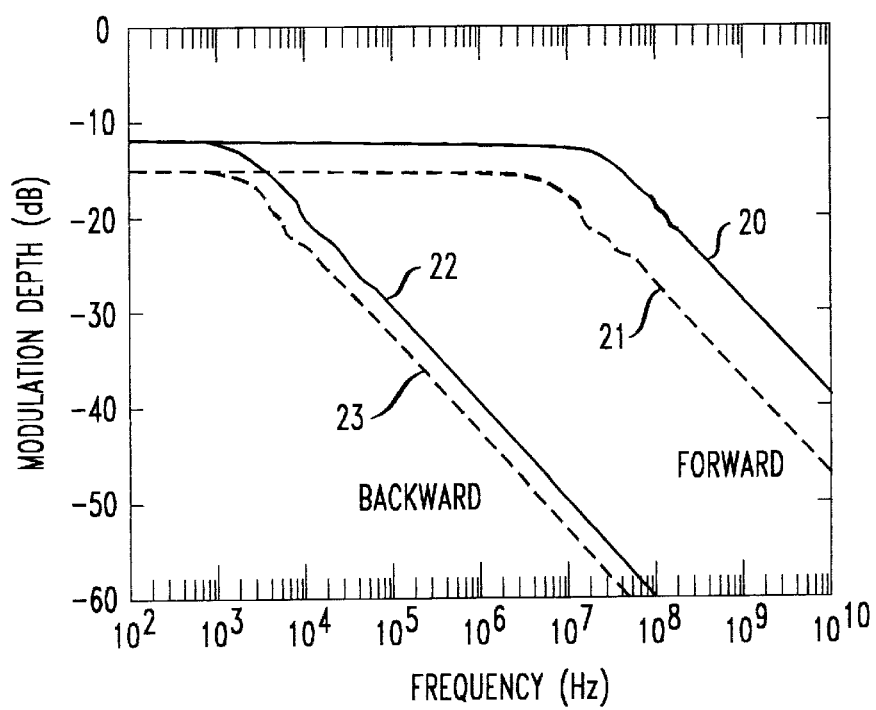
FIG. 2, on coordinates of modulation depth and frequency, is a plot comparing pump depletion crosstalk for forward and backward pumping.

FIG. 2 compares pump depletion crosstalk for forward pumping and backward pumping for a pair of channels centered about a system wavelength $\lambda$=1550 nm. The pair is likely a part of a larger WDM set—a set of four or more channels. Severity of crosstalk is additive for additional channels (so that modulation depth is increased by a factor of three for a 4-channel system). The form of the curves shown, including threshold position, is not changed for additional channels.

The figure investigates crosstalk between channels, $s_1$ on a channel operating at 1560 nm and $s_2$ on a channel operating at 1559 nm. The pump wavelength was 1440 nm—empirically determined to be optimum for Raman pumping. Signal, $s_1$ was sinusoidally modulated at frequency f. Signal $s_2$ was unmodulated. FIG. 2 information was developed by first computing evolution of a signal in an initially-undepleted pump, using the signal to determine pump depletion, and then determining the amplitude of the crosstalk during amplification of a second signal.

The study was conducted on two types of fiber: DSF (dispersion-null at 1550 nm); and "standard" fiber (dispersion-null at 1310 nm). DSF results are plotted on the continuous curves, standard fiber results are plotted on the dashed curves. Curve pair 20, 21 is for forward pumping, while pair 22, 23 is for backward pumping.

In a sense, the inventive advance shows dependence of pump-depletion crosstalk on the relative speeds of propagation of the signal and pump waves. (The separation between signal waves is so small that dispersion between them may be disregarded.) The relatively-greater spacing between curves 20 and 21 after the threshold is a measure of the difference in group velocity, or walk-off, between the pump and signal wavelengths for the two fibers. (In principle, the crosstalk may be lessened by increasing the wavelength difference between the signal and the pump. In practice, this is not available since SRS efficiency decreases beyond some optimum difference.) A finite dispersion fiber of U.S. Pat. No. 5,327,516, if of dispersion of positive sign, introduces PDM of magnitude dependent on the signal-pump walk-off (intermediate that of DSF and the much larger signal-pump walk-off of standard fiber). Choice of fiber dispersion will be based on other considerations such as 4WM, and not on PDM.

The level portions of the curves correspond with a modulation depth of about −13 dB, a value unsatisfactory for operation even in the 2-channel system plotted. (Introduction of additional channels increases modulation depth.) PDM continues at this level up to a frequency of about $10_7$ Hz (10 MHz) for the forward pumping case (curves 20,21). Only after 400 MHz does it begin to drop off to an acceptable level, e.g. of −20 dB or less. By contrast, for the backward pumping case, crosstalk is 20 dB down at 10 kHz. Forward pumping, in requiring elimination of all signal components below 100 MHz effectively precludes operation for modulation rates of 2.5 GHz, while backward pumping permits contemplated per-channel bit rates of 2.5 Gb/s and higher with only insignificant degradation.

Results for the 2-channel system are directly applicable to larger WDM sets. Maximum modulation due to PDM is additive for additional channels so that PDM of a particular channel in the worst case is three times greater for a 4-channel set than for a 2-channel set. (While this estimation serves for conservative design, modulation statistics suggest a lesser value, particularly as channel number increases.) The form of the curves and the positions of the thresholds do not vary sufficiently to be a concern for design purposes. The numbered examples compare the forward and backward pumping cases for a 4-channel system.

EXAMPLES 1 and 2

The systems include a 120 km regenerator span made up of three 40 km pumped spans. Channel wavelengths are: $\lambda_1$=1308 nm; $\lambda_2$=1309 nm; $\lambda_3$=1310 nm; and $\lambda_4$=1311 nm with a per-channel launched power of 1 mW and per-channel bit rate of 2.5 Gbs. Pumps operate at $\lambda_p$=1230 nm, and at a pump power $P_p$=652 mW.

Fiber is "unshifted" with dispersion null at 1300 nm. Effective core area is 80 $\mu m^2$. Fiber loss is 0.4 dB/km. Example 1 uses forward pumping, Example 2 uses backward pumping. The systems are otherwise identical.

Results—PDM crosstalk effectively prevents operation for forward pumping with crosstalk down 10 dB on each channel. With backward pumping, crosstalk was down 45 dB, so that operation was substantially unencumbered.

It is anticipated that the impact of the invention will take the form of total dependence on backward pumping. While no purpose for deviating is visualized, some minor degree of forward pumping may be tolerable. So for example, under the conditions of the Examples, use of a forward pump which is 35 dB down from the backward pump will double PDM crosstalk loss. Value is largely retained by systems in which at least 90% of the pump power is applied in the backward direction.

What is claimed is:

1. Non-soliton, light amplified, wavelength division multiplexed (WDM) optical waveguide system comprising an amplifier span of optical fiber including a fiber amplifier, means for introducing at least one set of WDM signal channels into the amplifier span in the transmission direction, and means for pumping the amplifier whereby signals are simultaneously amplified, in which amplification is primarily the consequence of stimulated Raman scattering (SRS),

CHARACTERIZED IN THAT pumping is solely in the direction counter to the transmission direction whereby Pump Depletion Modulation is reduced relative to systems which do not completely forgo pumping in the transmission direction.

2. System of claim 1 using distributed Raman amplification in which a major part of the span of optical fiber serves as amplification medium.

3. System of claim 1 in which one set of WDM signal channels is at a system wavelength of 1310 nm.

4. System of claim 1 in which one set of WDM signal channels is at a system wavelength of 1550 nm.

5. System of claim 1 with at least two sets of WDM signal channels.

6. System of claim 1 with a per-channel bit rate of at least 2.5 Gb/s.

7. System of claim 1 comprising at least two contiguous such amplifier spans.

8. System of claim 1 further comprising a regenerator span, said regenerator span including at least three such amplifier spans.

9. System of claim 1 in which means for pumping comprises a cladding pumped laser.

10. System of claim 1 in which frequency separation of pump and nearest WDM channel is a maximum of 15 terahertz.

* * * * *